(12) United States Patent
Bajko et al.

(10) Patent No.: US 7,434,258 B2
(45) Date of Patent: Oct. 7, 2008

(54) METHOD AND COMMUNICATION SYSTEM FOR CONTROLLING SECURITY ASSOCIATION LIFETIME

(75) Inventors: Gábor Bajko, Budapest (HU); Tao Haukka, Oulu (FI)

(73) Assignee: Nokia Corporation, Espoo (FI)

( * ) Notice: Subject to any disclaimer, the term of this patent is extended or adjusted under 35 U.S.C. 154(b) by 939 days.

(21) Appl. No.: 10/345,418

(22) Filed: Jan. 16, 2003

(65) Prior Publication Data

US 2003/0212912 A1 Nov. 13, 2003

Related U.S. Application Data

(60) Provisional application No. 60/377,965, filed on May 7, 2002.

(51) Int. Cl.
*H04L 9/00* (2006.01)
(52) U.S. Cl. .................. 726/21; 726/2; 726/3; 726/14; 713/150; 713/155; 713/168; 709/228
(58) Field of Classification Search ............. 726/2, 726/3, 21, 4, 14; 713/150, 155, 168; 340/5.8; 709/220, 227, 228
See application file for complete search history.

(56) References Cited

U.S. PATENT DOCUMENTS 5,642,398 A 6/1997 Tiedemann, Jr. et al.

OTHER PUBLICATIONS

S. Glass et al., Network Working Group, Request for Comments 2977: "Mobile IP Authentication, Authorization, and Accounting Requirements," Oct. 2000.*

R. Calhoun, IETF Internet Draft, "DIAMETER Mobile IP Extensions," Sep. 2000.*
Basilier et al., "AAA Requirements for IP Telephony / Multimedia," Internet Draft, IETF, Jul. 2000.*
Delphine Plasse: SIP for Call Control in the 3G IP-Based UMTS Core Network, Internetworking 2000, LNCS 1938, pp. 32-38, 2000, Springer-Verlag Pub.*
Voas, J. M., "Limited Software Warranties", Reliable Software Technologies, Apr. 1999, pp. 1-6.
Anonymous, "ARI's PartSmart Provides Electronic Price File Updates Over the Internet; Secure Website to Maintain Manufacturer Price Updates for Electronic Delivery to Dealers", Business Wire, Feb. 2002, pp. 1-2.

(Continued)

*Primary Examiner*—Emmanuel L Moise
*Assistant Examiner*—Paul Callahan
(74) *Attorney, Agent, or Firm*—Squire, Sanders & Dempsey, LLP

(57) ABSTRACT

A method for selecting a time length of a security association (SA) between user equipment (UE) which transmits and receives communications and a control entity in a communication system in accordance with the invention, includes transmitting a registration message (SM1) from the user equipment to the control entity (P-CSCF) requesting registration of the user equipment with the control entity; after transmission of the registration message, setting the time length of the security association between the user equipment and the control entity to be equal to a registration time length set between the user equipment and the control entity during which registration of the user equipment with the control entity is valid; and transmitting the set time length of the security association to the user equipment as part of an acknowledgment message (SM10 or SM12) to the registration message to cause the security association to have a time equal to the registration timer length.

41 Claims, 1 Drawing Sheet

OTHER PUBLICATIONS

Anonymous, "Metris Adds Identity Theft Protection Plan to Fraud Alert Services", Business Wire, May 2002, pp. 1-3.

33GPP TS 33.203 V5.3.0 (Sep. 2002) Technical Specification, 3rd Generation Partnership Project; Technical Specification Group Services and System Aspects; 3G Security; Access security for IP-based services (Release 5), pp. 1-37.

"Security Mechanism Agreement for the Session Initiation Protocol (SIP)" by J. Arrko, et al, Oct. 28, 2002, appearing in Network Working Group Internet-Draft, Expires Apr. 28, 2003, 22 pgs.

"HTTP Authentication: Basic and Digest Access Authentication", by J. Franks et al, Jun. 1999, appearing in Network Working Group (RFC 2617), 31 pgs.

* cited by examiner

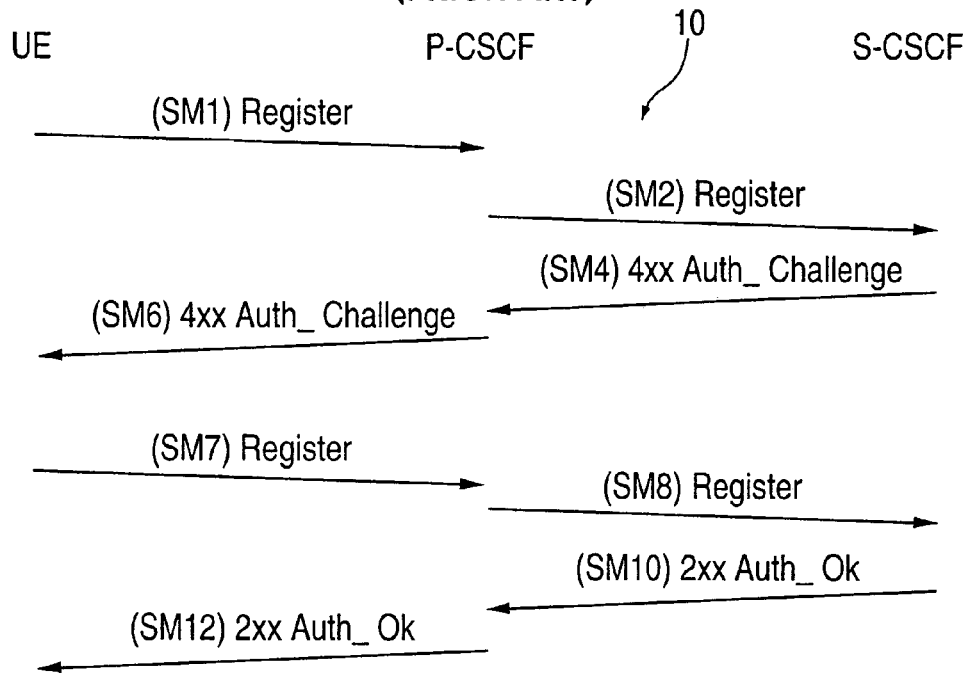
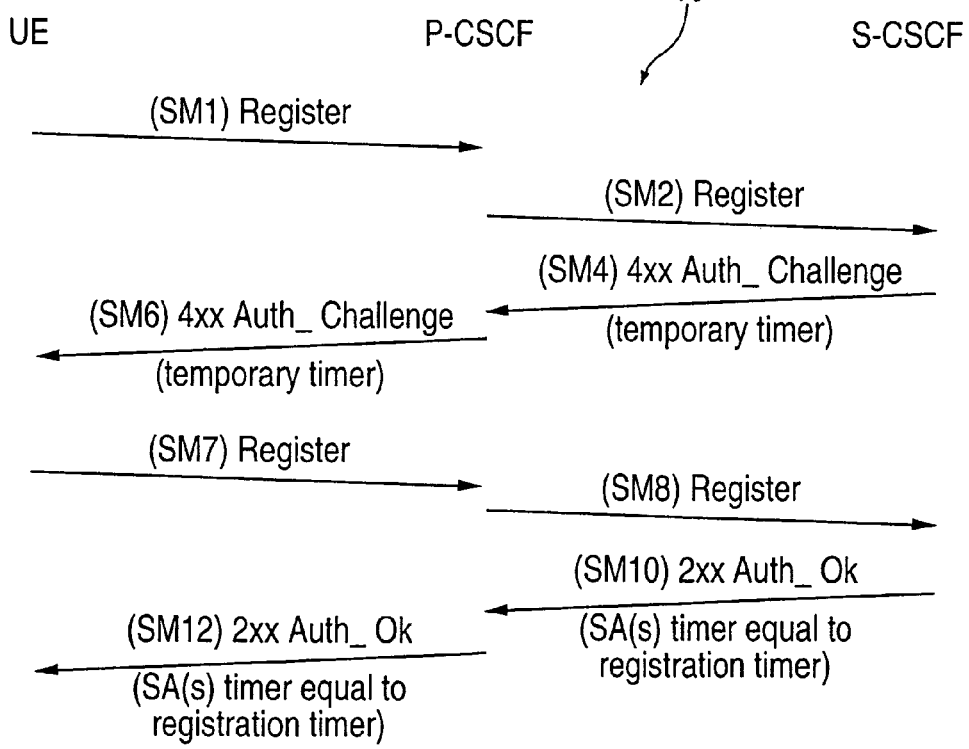

US 7,434,258 B2

METHOD AND COMMUNICATION SYSTEM FOR CONTROLLING SECURITY ASSOCIATION LIFETIME

CROSS REFERENCE TO RELATED APPLICATION

This application claims the benefit of the filing date of provisional application Serial No. 60/377,965, filed on May 7, 2002, entitled "Security Association Lifetime", which application is incorporated herein by reference in its entirety.

BACKGROUND OF THE INVENTION

1. Field of the Invention

This invention relates to selecting a Security Association (SA) timer between user equipment (UE) and a control entity in a communication system and in a preferred application selecting a SA timer for IPSec SA between the UE and a proxy call state control function (P-CSCF) in a 3G communications environment.

2. Description of the Prior Art

FIG. 1 illustrates a block diagram of a successful set up of SAs as set forth in Section 7.2 of 3GPP TS 33.203 V5.3.0 (2002-03) which is incorporated herein by reference in its entirety.

In the packet switched domain, service is not provided until a SA is established between the UE and the communication system 10 such as the P-CSCF. An IP Multimedia Core Network Subsystem (IMS) is essentially an overlay to the packet switched domain and has a low dependency on the packet switched domain. Consequently, a separate SA is required between a multimedia UE (client) and the IMS before access is granted to multimedia services.

The SA set up procedure is necessary in order to decide what security services to apply and when the security services are to start in the IMS. In the IMS, authentication of users is performed during registration as specified in section 6.1 of the aforementioned 3GPP publication. Subsequent signalling communications in a session are integrity protected based on keys derived during the authentication process.

For protecting IMS signalling between the UE and the P-CSCF, it is necessary to agree on shared keys that are provided by the IMS Authentication and Key Agreement (AKA) protocol and a set of parameters specific to a protection method. The security mode set up as described below with reference to FIG. 1 is used to negotiate the SA parameters required for authentication, but without confidentiality. Section 7.1 of the aforementioned 3GPP publication describes the SA parameters.

FIG. 1 illustrates the normal case of setup of SAs using SIP protocol messages when failure does not occur. Some of the nodes and messages in a typical SIP architecture, which are not directly related to the set up of a SA, have been omitted. Accordingly, there are gaps in the numbering of messages and the Interrogating Call State Control Function (I-CSCF) has been omitted. The UE sends a SM1 REGISTER message to the P-CSCF and towards the Serving Call State Control Function (S-CSCF) to register the location of the UE and to set up the security mode. In order to start the security mode set-up procedure, the UE includes a security set-up line in the SM1 REGISTER message. The security setup line in SM1 contains the Service Provisioning Infrastructure (SPI) numbers, the protected port selected by the UE and a list of identifiers for the integrity algorithms which the UE supports. Upon receipt of the SM1 REGISTER message by the P-CSCF, the P-CSCF temporarily stores the parameters received in the security set-up line together with the UE's IP address from the source IP address of the IP packet header, the IP multimedia IM Private Identity (IMPI) and the IM Public Identity (IMPU). The P-CSCF sends a SM2 REGISTER message to the S-CSCF. Upon receipt by the P-CSCF of a SM4 4xx Auth_Challenge message originated from the S-CSCF in response to the SM2 REGISTER message, the P-CSCF adds the key $IK_{IM}$ received from the S-CSCF to the temporary stored parameters. The P-CSCF then selects the SPI for the inbound SA. The P-CSCF defines the SPIs such that they are unique and different from any SPIs received in the security-set-up line of the UE. This role is needed since the UE and the P-CSCF use the same key for inbound and outbound traffic. In order to determine the integrity of the algorithm, the P-CSCF proceeds such that the P-CSCF has a list of integrity algorithms that the P-CSCF supports, ordered by priority. The P-CSCF selects the first integrity algorithm on its own which is also supported by the UE. The P-CSCF then establishes another pair of SAs in the local security association data base. The security set-up line in the SM6 message contains the SPI assigned by the P-CSCF and a fixed number of the protected port at the P-CSCF. The SM6 message also contains a list of identifiers for the integrity algorithms which the P-CSCF supports. Upon receipt of the SM6 message, the UE determines the integrity algorithm so that UE selects the first integrity algorithm on the list received from the P-CSCF in the SM6 message which is also supported by the UE. The UE then proceeds to establish another pair of SAs. The UE integrity protects the SM7 message and all the following SIP messages. The list of integrity algorithms received in SM6 message are included. After receiving the SM7 message from the UE, the P-CSCF checks whether the integrity algorithm list received in the SM7 message is identical with the integrity algorithms list in the SM6 message. If this is not the case, the registration procedure is aborted. The P-CSCF includes in the SM8 message information for the S-CSCF that the received message from the UE was integrity protected. The P-CSCF adds this information to all subsequent registration messages received from the UE that have successfully passed the integrity check in the P-CSCF. The S-CSCF sends a SM10 2xx Auth_Ok message to the P-CSCF. The P-CSCF sends a SM12 2xx Auth_Ok message to the UE. The SM12 message does not contain information specific to security mode setup (i.e., a security-set-up line). However, when the SM12 message does not indicate any error, the P-CSCF confirms that security mode setup has been successful. After receiving the SM12 message not indicating any error, the UE assumes successful completion of the security-mode set-up.

Every registration message that includes a user authentication attempt produces new SAs. If the authentication attempt is successful, then these new SAs replace previous ones. If the UE has an already active SA, then the UE uses this to protect the registration message. IF the S-CSCF is notified by the P-CSCF that the registration message from the UE was integrity protected, the S-CSCF may decide not to authenticate the user by means of the AKA protocol. However, the UE may send unprotected registration messages at any time. In this case, the S-CSCF authenticates the user by means of the AKA protocol. In particular, if the UE has an indication that the SA is no longer active at P-CSCF side, the UE sends an unprotected registration message. SAs may be unidirectional or bidirectional. For IP layer SAs, the lifetime is held at the application layer. Furthermore, deleting a SA means deleting the SA from both the application and the IPsec layer.

A UE is involved in only one registration procedure at a time. The UE removes any data relating to any previous incomplete registrations or authentications, including SAs created by an incomplete authentication. The UE may start a registration procedure with an existing pair of SAs. These SAs are referred to as an old SAs. The authentication produces a pair of new SAs. These new SAs shall not be used to protect non-authentication traffic until noted during the authentication of flow. In the same way, certain message in the authentication are protected with a particular SA. If the UE receives a message protected with incorrect SA, it shall discard the message.

RFC 3261, which is incorporated herein by reference in its entirety, describes the SIP protocol. As described in Section 10.3 therein, when a UE sends a REGISTER message, a registrant, which may be the P-CSCF, processes the request. The REGISTER message has a Contact address and Contact header field for each address.

The determination of the expiration time of registration of a UE is as follows:
(1) if the field value has an expires parameter, that value must be used.
(2) If there is no such parameter, but the request has an Expires header field, that value must be used.
(3) If there is neither, a locally configured default value must be used. The registrant may shorten the expiration interval.

With the SIP protocol, the so-called "non-INVITE transaction timeout timer" is 32 seconds. This timer is used as a temporary timer when sending the SM4 and SM6 messages as described above. The UE has 30 seconds to send the SM7 REGISTER message, containing the response to the SM6 4xx Auth_Challenge message by the network. When the authentication challenge in the SM6 message is answered in time with SM7 and SM8 REGISTER messages and the result is verified by the network, a SIP 200 Ok response is sent to the UE with messages SM10 and SM12 described above. The 200 Ok message contains an Expires header or a Contact field described above that indicates the time length of the registration of the UE with the control entity.

In the prior art, the SA timer can be set rather long, which results in network inefficiency in database management and the chance for UE to flood attack the P-CSCF with messages that require an appropriate response. If the UE does not have a SA with the network, such messages do not reach the P-CSCF which is preferred by the network operators because of more efficient use of resources.

In 3G communication systems, the UE has to register and re-register from time to time. When a re-registration is not requested within a specified time, subscriber data is deleted from the network elements responsible for handling the communications to and from the UE, such as the P-CSCF. Therefore, a registration timer is maintained in the UE to determine when re-registration is appropriate.

SUMMARY OF THE INVENTION

The present invention is a method for selecting a time length of a SA(s) between a UE which transmits and receives communications and a control entity in a communication system and a communication system in which the lifetime of a SA(s) is set with sufficient time to allow completion of the registration. This goal is accomplished with the invention by the UE setting the lifetime of each new SA(s) equal to the time duration of the registration timer which determines the time limit a registration of a UE is invalid. The SA(s) are set for bidirectional communications between the UE and the control entity of the communication system. In a preferred embodiment, the control entity is the P-CSCF. Also, in accordance with the invention, an old SA as is continued for one more interval than when deletion should occur when a new SA is set with a time duration equal to the registration times.

In accordance with a preferred embodiment of the invention using the SIP protocol, the SM1 REGISTER message is sent by the UE to register the UE with the IMS at the P-CSCF. If the SM1 message is protected, it is protected with an old outbound SA. The UE receives an authentication challenge in a SM6 message from the P-CSCF which is protected with the old outbound SA if the SM1 message was protected and is unprotected otherwise. If the SM6 message can be successfully processed by the UE, the UE creates at least one new SA, which is derived in accordance with the security association parameters of Section 7.1 of the 3GPP TS 33.203 V. 5.3.0 (2002-09). The lifetime of each new SA(s) created at this time is set to allow enough time to complete the registration procedure. The UE sends a SM7 message before expiration of a temporary timer value sent in the SM4 and SM6 messages to the P-CSCF which is protected with the new outbound SA. The P-CSCF sends a SM8 message to the S-CSCF. If the SM1 message was protected, the new SAs can now be used to protect messages other than those in the authentication. Furthermore, for outbound traffic, the new SA is used. The S-CSCF sends a SM10 message to the P-CSCF which uses the registration timer value contained in the Expires or Contact header to set the time duration of the new SA in the P-CSCF. The UE receives the SM12 message from the P-CSCF indicating successful authentication from the P-CSCF which is protected with the new outbound SA. The UE uses the registration time value contained in the Expires or Contact header to set the time duration of the new SA therein. After the successful processing of the message by the UE, registration is complete. The old SAs are now deleted or optionally may be retained for one more interval and the new SAs are used to protect all messages and have a time duration equal to a time length of the registration timer value contained in the SM10 and SM12 messages.

The present invention eliminates the problems of the prior art by eliminating the flooding of the P-CSCF with messages when the time duration of new SA(s), was not set to have any particular time length with respect to the registration timer and had a time duration longer than the registration timer for the UE to register with the control entity of the communication system. As a result of the invention, the efficiency of the communication system is enhanced in accordance with the present invention.

A method for selecting a time length of a security association between user equipment which transmits and receives communications and a control entity in a communication system in accordance with the invention includes transmitting a registration message from the user equipment to the control entity requesting registration of the user equipment with the control entity; after transmission of the registration message, setting the time length of the security association between the user equipment and the control entity to be equal to a registration timer length set between the user equipment and the control entity during which registration of the user equipment with the control entity is valid; and transmitting the set time length of the security association to the user equipment as part of an acknowledgment message to the registration message to cause the security association to have a time equal to the registration timer. The control entity may perform a call state control function in the communication system. Communications between the user equipment and the communication system may use the Session Initiated Protocol (SIP) and the registration message may be a SIP REGISTER request message and the acknowledgment message may be a SIP 2xx response message. An authentication challenge may be sent including a temporary timer to the user equipment, preceding the acknowledgment, which sets a time duration for the user equipment to respond to the authentication challenge. A registration message may be sent from the user equipment to the control entity in a response message to the authentication challenge within the set time duration for the user equipment to respond to the authentication challenge. The time duration may be contained in one of an Expires or Contact header of the SIP protocol. The temporary timer may be a non-INVITE transaction timeout timer of the SIP protocol.

A communication system in accordance with the invention including a user equipment which transmits and receives communications and a control entity which provides control functions in the communication system, and wherein a registration message is transmitted from the user equipment to the control entity requesting registration of the user equipment with the control entity; after transmission of the registration message, the time length of the security association between the user equipment and the control entity is set to be equal to a time length of a registration timer set between the user equipment and the control entity during which registration of the user equipment with the control entity is valid; and the set time length of the security association is transmitted from the control entity to the user equipment as an acknowledgment message to the registration message to cause the security association to have a time duration equal to the registration timer. The control entity may perform a call state control function in the communication system. Communications between the user equipment and the communication system may use the Session Initiated Protocol (SIP) and the registration message may be a SIP REGISTER request message and the acknowledgment message may be a SIP 2xx response message. An authentication challenge may be sent including a temporary timer to the user equipment, preceding the acknowledgment, which sets a time duration for the user equipment to respond to the authentication challenge. A registration message may be sent from the user equipment to the control entity in a response message to the authentication challenge within the set time duration for the user equipment to respond to the authentication challenge. The time duration may be contained in one of an Expires or Contact header of the SIP protocol. The temporary timer may be a non-INVITE transaction timeout timer of the SIP protocol.

BRIEF DESCRIPTION OF THE DRAWINGS

FIG. 1 illustrates the prior art registration of a UE in a communication system using the SIP protocol including P-CSCF and S-CSCF control entities therein.

FIG. 2 illustrates a method of setting the time duration of a new SA(s) to be equal to the registration timer controlling registration of a UE as in the prior art system of FIG. 1.

Like parts are identified identically in FIGS. 1 and 2.

DESCRIPTION OF THE PREFERRED EMBODIMENT

A communication system and a method which sets the SA(s) to have a timer duration equal to the registration timer defining when registration of a UE is valid in accordance with the invention is described in conjunction with FIG. 2. While the invention has been described with reference to the SIP protocol, it should be understood that the invention is not limited thereto.

The first step in FIG. 2 is that the UE sends a registration message to a communication system control entity requesting registration of the UE. The control entity in a preferred embodiment is a P-CSCF and the registration message is the SM1 SIP REGISTER message transmitted to the P-CSCF in accordance with the prior art. The P-CSCF forwards the registration message, which preferably is the SM2 SIP REGISTER message, to the S-CSCF. The S-CSCF sends an authentication challenge message which preferably is the SIP SM4 message 4xx AUTH_Challenge message to the P-CSCF. The P-CSCF sends an authentication challenge message, which is preferably the SIP protocol SM6 4xx AUTH_Challenge, to the UE. The SM4 and SM6 authentication challenge messages include a temporary timer setting a time limit for the UE to transmit registration message, which preferably is the SM7 REGISTER message of the SIP protocol, in response to the authentication challenge message SM6. In one embodiment of the invention, the temporary timer value is set equal to 32 seconds, which is the non-INVITE transaction timeout timer of the SIP protocol. The P-CSCF determines by processing the SM7 message if the UE has responded within the temporary timer value. If the temporary timer expires, the registration process and the setting of SA is aborted. The P-CSCF then sends a register message, which is preferably the SIP protocol SM8 REGISTER message, to the S-CSCF. The S-CSCF sets the time length of its SA for the P_CSCF equal to the registration timer limit contained in the SM8 message. The set time limit for the SA, which is equal to the registration timer, is sent as part of the SM10 message to the P-CSCF and then from the P-CSCF as the SM12 message to the UE. When the invention is practiced with the SIP protocol, the Expires or Contact Fields may be used to contains the set timer limit for the new SA(s). The P-CSCF also sets its SA time interval to be equal to the registration timer interval. The P-CSCF forwards the set value of its SA timer, which is equal to the registration timer, to the UE. The UE sets the time limit for its SA for communications with the P-CSCF to be equal to a registration timer length set by the UE defining when registration of the UE with the control entity is valid. The time length of the SAs is for bidirectionally communications between the P-CSCF and the UE. The invention is not limited to the SA time limit being sent by the SM 10 and SM 12 messages and is not limited to using the Expires and Contact headers to transmit the SA time limit to the P-CSCF and the UE. The time limit is preferably transmitted as part of the acknowledgment message which, in a preferred embodiment, is the SM10 and SM12 messages of the SIP protocol, which are responsive to the SM8 registration message received by the S-CSCF. Setting of the one or more SAs equal to the time length of the registration timer between the UE and the P-CSCF ensures that the problem of the prior art of flooding the P-CSCF with messages is eliminated as described above.

While the present invention has been described in terms of its preferred embodiments, it should be understood that numerous modifications may be made thereto without departing from the spirit and scope of the present invention. It is intended that all such modifications fall within the scope of the appended claims.

The invention claimed is:

1. A method, comprising:
  receiving a registration message from a user equipment, wherein the registration message is configured to request registration of the user equipment, and wherein the user equipment is configured to transmit and receive communications;
  after receiving the registration message, setting a time length of a security association to be equal to a registration time length set for a registration of the user equipment;

transmitting the set time length of the security association to the user equipment as part of an acknowledgment message to the registration message to cause the security association to have a time equal to the registration time length; and sending an authentication challenge comprising a temporary timer to the user equipment, preceding the acknowledgment message, which sets a time duration for the user equipment to respond to the authentication challenge, wherein communications with the user equipment comprise a session initiation protocol, wherein the registration message comprises a session initiation protocol register request message, and wherein the acknowledgment message comprises a session initiation protocol response message.

2. A method in accordance with claim 1, further comprising:
performing a call state control function.

3. A method in accordance with claim 2, wherein: the session initiation protocol response comprises a 200 Auth_Ok message.

4. A method in accordance with claim 2 comprising:
receiving a registration message from the user equipment in a response message to the authentication challenge within the set time duration for the user equipment to respond to the authentication challenge.

5. A method in accordance with claim 3, comprising:
receiving a registration message from the user equipment in a response message to the authentication challenge within the set time duration for the user equipment to respond to the authentication challenge.

6. A method in accordance with claim 3, wherein:
the time length is contained in one of an expires or contact header of the session initiation protocol.

7. A method in accordance with claim 2, wherein:
the temporary timer comprises a non-invite transaction timeout timer of the session initiation protocol.

8. A method in accordance with claim 3, wherein:
the temporary timer comprises a non-invite transaction timeout timer of the session initiation protocol.

9. A method in accordance with claim 1, wherein:
the session initiation protocol response comprises a 200 Auth_Ok message.

10. A method in accordance with claim 9, comprising:
receiving a registration message from the user equipment in a response message to the authentication challenge within the set time duration for the user equipment to respond to the authentication challenge.

11. A method in accordance with claim 9, wherein:
the time length is contained in one of an expires or contact header of the session initiation protocol.

12. A method in accordance with claim 9, wherein:
the temporary timer comprises a non-invite transaction timeout timer of the session initiation protocol.

13. A method in accordance with claim 1, further comprising:
receiving a registration message from the user equipment in a response message to the authentication challenge within the set time duration for the user equipment to respond to the authentication challenge.

14. A method in accordance with claim 1, comprising:
receiving a registration message from the user equipment in response message to the authentication challenge within the set time duration for the user equipment to respond to the authentication challenge.

15. A method in accordance with claim 1, wherein:
the time length is contained in one of an expires or contact header of the session initiation protocol.

16. A method in accordance with claim 1, wherein:
the time length is contained in one of an expires or contact header of the session initiation protocol.

17. A method in accordance with claim 1, wherein:
the temporary timer comprises non-invite transaction timeout timer of the session initiation protocol.

18. A method in accordance with claim 1, wherein:
the temporary timer comprises a non-invite transaction timeout timer of the session initiation protocol.

19. An apparatus, comprising:
a receiver configured to receive a registration message from a user equipment, wherein the user equipment is configured to transmit and receive communications, and wherein the registration message is configured to request registration of the user equipment with the apparatus;

a timer configured to set, after receipt of the registration message, a time length of a security association between the user equipment and the apparatus, wherein the time length is set to be equal to a time length of a registration timer set between the user equipment and the apparatus during which registration of the user equipment with the apparatus is valid; and a transmitter configured to transmit the set time length of the security association to the user equipment as an aclnowledgement message to the registration message to cause the security association to have a time duration equal to the registration time length, wherein communications between the user equipment and the apparatus are configured to use a session initiation protocol, wherein the registration message comprises a session initiation protocol register request message, wherein the acknowledgment message comprises a session initiation protocol response message, and wherein the transmitter is further configured to transmit an authentication challenge comprising a temporary timer to the user equipment, preceding the acknowledgment message, which sets a time duration for the user equipment to respond to the authentication challenge.

20. An apparatus in accordance with claim 19 wherein:
the apparatus is configured to perform a call state control function.

21. An apparatus in accordance with claim 20, wherein:
the session initiation protocol response message comprises a 200 Auth_Ok message.

22. An apparatus in accordance with claim 21, wherein:
the receiver is further configured to receive a registration message from the user equipment to the apparatus in a response message to the authentication challenge within the time duration set for the user equipment to respond to the authentication challenge.

23. An apparatus in accordance with claim 21 wherein:
the set time length is contained in one of an expires or contact header of the session initiation protocol.

24. An apparatus in accordance with claim 21 wherein:
the temporary timer comprises a non invite transaction timeout timer of the session initiation protocol.

25. An apparatus in accordance with claim 20, wherein:
the receiver is further configured to receive a registration message from the user equipment to the apparatus in a response message to the authentication challenge within the time duration set for the user equipment to respond to the authentication challenge.

26. An apparatus in accordance with claim 20 wherein:
the set time length is contained in one of an expires or contact header of the session initiation protocol.

27. An apparatus in accordance with claim 20 wherein:
the temporary timer comprises a non-invite transaction timeout timer of the session initiation protocol.

28. An apparatus in accordance with claim 19 wherein:
the session initiation protocol response message comprises a 200 Auth_Ok message.

29. An apparatus in accordance with claim 28, wherein:
the receiver is further configured to receive a registration message from the user equipment to the apparatus in a response message to the authentication challenge within the time duration set for the user equipment to respond to the authentication challenge.

30. An apparatus in accordance with claim 28 wherein:
the set time length is contained in one of an expires or contact header of the session initiation protocol.

31. An apparatus in accordance with claim 28 wherein:
the temporary timer comprises a non-invite transaction timeout timer of the session initiation protocol.

32. An apparatus in accordance with claim 19, wherein:
the receiver is further configured to receive a registration message from the user equipment to the apparatus in a response message to the authentication challenge within the time duration set for the user equipment to respond to the authentication challenge.

33. An apparatus in accordance with claim 19 wherein:
the set time length is contained in one of an expires or contact header of the session initiation protocol.

34. An apparatus in accordance with claim 19 wherein:
the temporary timer comprises a non-invite transaction timeout timer of the session initiation protocol.

35. An apparatus, comprising:
receiving means for receiving a registration message from a user equipment, wherein the user equipment is configured to transmit and receive communications, and wherein the registration message is configured to request registration of the user equipment with the apparatus;
timing means for setting, after receiving the registration message, a time length of a security association between the user equipment and the apparatus, wherein the time length is set to be equal to a time length of a registration timer set between the user equipment and the apparatus during which registration of the user equipment with the apparatus is valid;
transmitting means for transmitting the set time length of the security association to the user equipment as an acknowledgement meaasge to the registration message to cause the security association to have a time duration equal to the registration time length,
wherein communications between the user equipment and the apparatus are configured to use a session initiation protocol,
wherein the registration message comprises a session initiation protocol register request message,
wherein the acknowledgement message comprises a session initiation protocol response message , and
wherein the transmitting means is further for transmitting an authentication challenge comprising a temporary timer to the user equipment, preceding the acknowledgement message, which sets a time duration for the user equipment to respond to the authentication challenge.

36. A computer readable storage medium encoded with instructions that, when executed by a computer, perform:
receiving a registration message from a user equipment, wherein the registration message is configured to request registration of the user equipment, and wherein the user equipment is configured to transmit and receive communications;
after receiving the registration message, setting a time length of a security association to be equal to a registration time length set for a registration of the user equipment;
transmitting the set time length of the security association to tthe user equipment as part of an acknowledgment message to the registration message to cause the security association to have a time equal to the registration time length; and
sending an authentication challenge comprising a temporary timer to the user equipment, preceding the acknowledgemnt message, which sets a time duration for the user equipment to respond to the authentication challenge,
wherein communications with the user equipment comprise a session initiation protocol,
wherein the registration message comprises a session initiation protocol register request message, and
wherein the acknowledgement message comprises a session initiation protocol response message.

37. The computer readable storage medium as claimed in claim 36, wherein the instructions, when executed by the computer, further perform:
performing a call state control function.

38. The computer readable storage medium as claimed in claim 36, wherein the session initiation protocol response comprises a 200 Auth_Ok message.

39. The computer readable storage medium as claimed in claim 36, wherein the instructions, when executed by the computer, further perform:
receiving a registration message from the user equipment in a response message to the authentication challenge within the set time duration for the user equipment to respond to the authentication challenge.

40. The computer readable storage medium as claimed in claim 36, wherein the time length is contained in one of an expires or contact header of the session initiation protocol.

41. The computer readable storage medium as claimed in claim 36, wherein the temporary timer comprises a non-invite transaction timeout timer of the session initiation protocol.

* * * * *